United States Patent

Cho et al.

[19]

[11] Patent Number: 5,623,334
[45] Date of Patent: Apr. 22, 1997

[54] OPTICAL DISTANCE MEASUREMENT APPARATUS AND METHOD USING CLEANING DEVICE

[75] Inventors: Jung S. Cho; Deog S. Cho, both of Kyoungki-do, Rep. of Korea

[73] Assignee: Hyundai Electronics Industries Co., Ltd., Kyoungi-do, Rep. of Korea

[21] Appl. No.: 365,916

[22] Filed: Dec. 29, 1994

[30] Foreign Application Priority Data

Dec. 29, 1993 [KR] Rep. of Korea .................. 93-30542
Dec. 29, 1993 [KR] Rep. of Korea .................. 93-30571
May 9, 1994 [KR] Rep. of Korea .................. 94-10157
May 9, 1994 [KR] Rep. of Korea .................. 94-10158

[51] Int. Cl.$^6$ .............................. B60T 7/16; G01C 3/08
[52] U.S. Cl. .................. 356/4.02; 180/169; 356/5.01; 356/5.1; 356/5.05; 356/5.06
[58] Field of Search .................. 356/5.01–5.15, 356/4.02; 180/167, 169

[56] References Cited

U.S. PATENT DOCUMENTS

| | | |
|---|---|---|
| 4,274,736 | 6/1981 | Balmer . |
| 4,722,599 | 2/1988 | Fruengel . |
| 5,091,726 | 2/1992 | Shyu . |
| 5,122,796 | 6/1992 | Beggs et al. .................. 180/169 |
| 5,160,971 | 11/1992 | Koshizawa .................. 356/5 |
| 5,230,400 | 7/1993 | Kakinami et al. .................. 180/169 |
| 5,357,438 | 10/1994 | Davidian .................. 180/169 |

*Primary Examiner*—Stephen C. Buczinski
*Attorney, Agent, or Firm*—Helfgott & Karas, PC.

[57] ABSTRACT

Optical distance measurement apparatus and method. The apparatus comprises a light emitting circuit, a light receiving circuit, a trigger signal generation circuit, a pollution sensor, a diode abnormal state sensor, a control/time-distance conversion circuit, a cleaning device and a car collision prevention device. The pollution sensor receives a part of a light beam which is emitted from the light emitting circuit and then reflected from protecting glass mounted on a front side of the apparatus, to sense a variation in a reflectivity of the protecting glass, and discriminates a polluted state of the protecting glass in accordance with the sensed result. The diode abnormal state sensor receives the part of the light beam which is emitted from the light emitting circuit and then reflected from the protecting glass, to sense an abnormal state of a light emitting laser diode in the light emitting circuit, and emits a light beam to the light receiving circuit through the protecting glass to sense an abnormal state of a light receiving photo diode in the light receiving circuit. The cleaning device removes pollution on a front surface of the protecting glass under control of the control/time-distance conversion circuit.

12 Claims, 8 Drawing Sheets

OPTICAL DISTANCE MEASUREMENT APPARATUS AND METHOD USING CLEANING DEVICE

BACKGROUND OF THE INVENTION

1. Field of the Invention

The present invention relates in general to an optical distance measurement apparatus using a pulse light beam, and more particularly to optical distance measurement apparatus and method using a cleaning device in which a pollution sensor is provided to sense pollution, the cleaning device being disposed over a front surface of a protecting glass to remove the sensed pollution, a diode abnormal state sensor being provided to sense an error of a light emitting laser diode using a photo diode for monitoring the light emitting laser diode and an error of a light receiving photo diode using a laser diode for monitoring the light receiving photo diode, wherein a time period in which a part of a pulse light beam from the light emitting laser diode is reflected from a reflection surface of the cleaning device and then received by the light receiving photo diode, is converted into error data and the converted error data is subtracted from a measured light moving time to an object, the error data resulting from a temperature variation, faulty operations of the components.

2. Description of the Prior Art

Conventional distance measurement equipments are mostly adapted to measure distances to objects using standard measurement devices with corresponding lengths.

On the other hand, a conventional optical distance measurement apparatus measures a light moving time and then a distance to an object on the basis of the measured light moving time and a light velocity. A precision in the distance measurement is dependent on the accuracy in the light moving time measurement. However, since a light beam moves 30 cm per 1 nsec, it is very difficult to measure accurately the light moving time. Namely, because the light moving time is very short, the measured light moving time may be different according to an external variation or self-variations of components and a pollution level on a front surface of the glass for protecting the components. For this reason, it is very difficult to measure accurately a light moving distance.

In other words, in such a conventional optical distance measurement apparatus, the front surface of the protecting glass may be polluted at any time due to external circumstances because it is exposed to the outside. Also, the presence of a faulty operation of a laser diode as an important component must be checked at fixed periods in the process. Further, according to a temperature, there may be a variation in the signal delay of components for receiving an emitted light beam, converting the received light beam into an electrical signal, amplifying the converted electrical signal and measuring the light moving time using the amplified electrical signal. Furthermore, the delay error may be generated due to deviations of products. In this case, a separate adjustment must be applied to every product, for compensation for the delay error. However, the delay error due to the temperature cannot be adjusted in use, resulting in an error in the measurement.

SUMMARY OF THE INVENTION

Therefore, the present invention has been made in view of the above problems, and it is an object of the present invention to provide an optical distance measurement apparatus and a method using a cleaning device in which a performance of a car collision prevention system using the optical distance measurement apparatus can be prevented from being degraded due to pollution of the optical distance measurement apparatus, an error of a light emitting laser diode and an error of a light receiving photo diode being sensed by a diode abnormal state sensor, a time period that a part of a pulse light beam from the light emitting laser diode is reflected from a reflection surface of the cleaning device and then received by the light receiving photo diode, is measured and the measured time is subtracted from a measured light moving time to an object, so that a distance to the object can accurately be measured.

In accordance with one aspect of the present invention, there is provided an optical distance measurement apparatus comprising light emitting means for emitting a high-power pulse light beam as a distance measuring medium to an object; light receiving means for receiving a light beam reflected from the object; trigger signal generation means for generating a trigger signal indicative of a start time point for measurement of a light moving time; pollution sensing means for receiving a part of the light beam which is emitted from said light emitting means and then reflected from protecting glass mounted on a front side of the apparatus, to sense a variation in a reflectivity of said protecting glass, and discriminating pollution on a front surface of said protecting glass in accordance with the sensed result; diode abnormal state sensing means for receiving the part of the light beam which is emitted from said light emitting means and then reflected from said protecting glass, to sense an abnormal state of a light emitting laser diode in said light emitting means, and emitting a light beam to said light receiving means through said protecting glass to sense an abnormal state of a light receiving photo diode in said light receiving means; control/time-distance conversion means for controlling the entire operation of the apparatus in response to an output signal from said pollution sensing means and an output signal from said diode abnormal state sensing means, measuring the light moving time in response to the trigger signal from said trigger signal generation means and an output signal from said light receiving means and converting the measured light moving time into a distance to the object; cleaning means for removing the pollution on the front surface of said protecting glass under the control of said control/time-distance conversion means; and car collision prevention means for giving an alarm to the user and accelerating or decelerating a car under the control of said control/time-distance conversion means when a dangerous situation occurs in traveling of the car.

In accordance with another aspect of the present invention, there is provided an optical distance measurement method comprising the steps of driving a laser diode to emit a light beam to an object, receiving a part of the light beam which is emitted from said laser diode and then reflected from a protecting glass and sensing pollution on a front surface of said protecting glass in accordance with the received state; sensing an error of said laser diode; sensing an error of a photo diode for receiving the light beam from said laser diode; and measuring a time delay value resulting from a temperature variation and obtaining an actual distance to the object on the basis of the measured time delay value.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
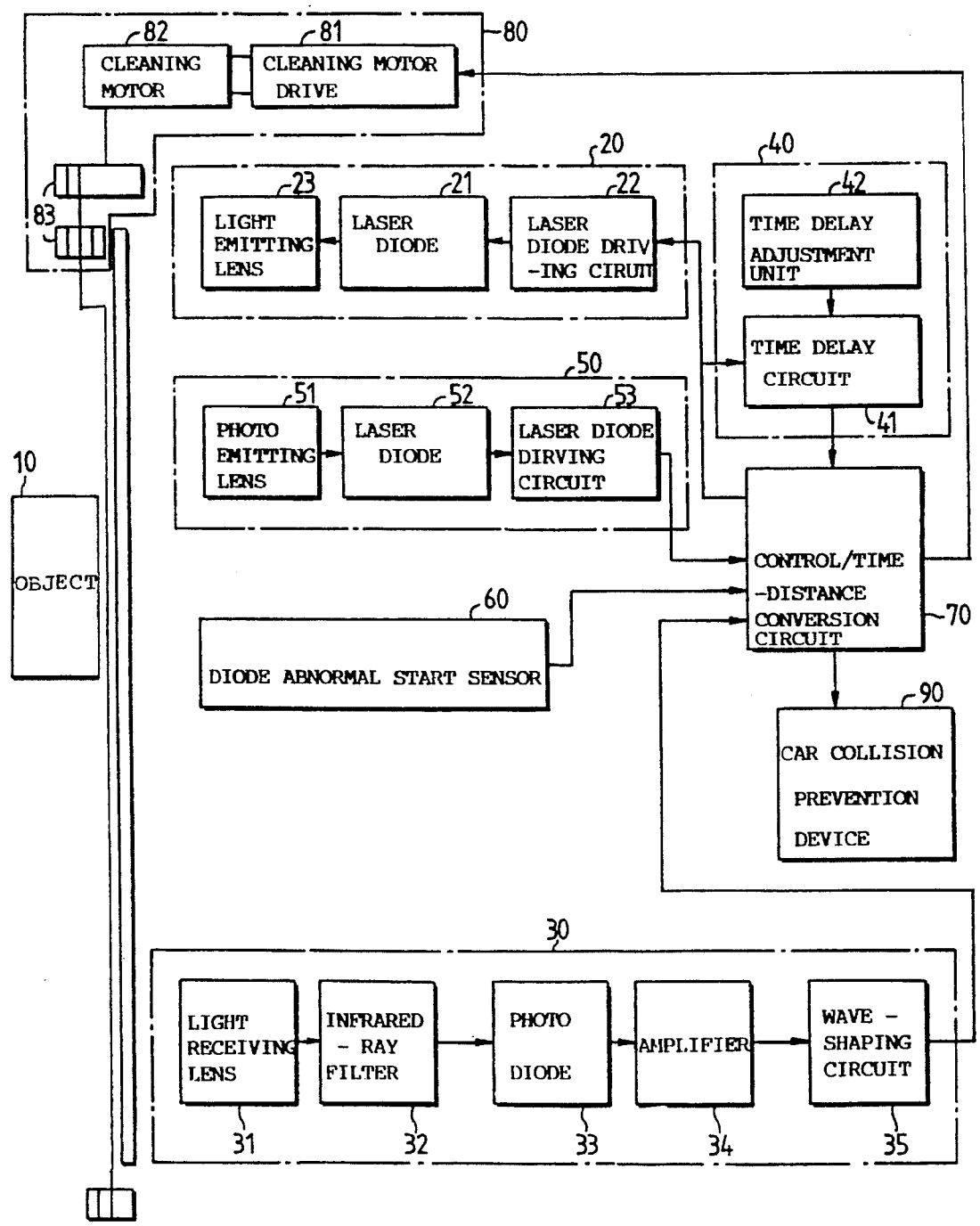
FIG. 1 is a block diagram of an optical distance measurement apparatus using a cleaning device in accordance with a first embodiment of the present invention.

Referring to FIG. 1, there is shown a block diagram of an optical distance measurement apparatus using a cleaning device in accordance with a first embodiment of the present invention. In this drawing, the cleaning device is designated by the reference numeral 80.

As shown in FIG. 1, the optical distance measurement apparatus comprises a light emitting circuit 20 for emitting a high-power pulse light beam as a distance measuring medium to an object 10, a light receiving circuit 30 for receiving a light beam reflected from the object 10, and a trigger signal generation circuit 40 for generating a trigger signal indicative of a start time point for measurement of a light moving time.

A pollution sensor 50 is adapted to receive a part of the light beam which is emitted from the light emitting circuit 20 and then reflected from protecting glass 84 mounted on a front side of the apparatus, to sense a variation in a reflectivity of the protecting glass 84, and discriminate pollution on a front surface of the protecting glass 84 in accordance with the sensed result.

A diode abnormal state sensor 60 is adapted to receive the part of the light beam which is emitted from the light emitting circuit 20 and then reflected from the protecting glass 84, to sense an abnormal state of a light emitting laser diode 21 in the light emitting circuit 20 and emit a light beam to the light receiving circuit 30 through the protecting glass 84 to sense an abnormal state of a light receiving photo diode 33 in the light receiving circuit 30.

A control/time-distance conversion circuit 70 is adapted to control the entire operation of the apparatus in response to an output signal from the pollution sensor 50 and an output signal from the diode abnormal state sensor 60, measure the light moving time in response to the trigger signal from the trigger signal generation circuit 40 and an output signal from the light receiving circuit 30 and convert the measured light moving time into a distance to the object 10.

The cleaning device 80 is adapted to remove the pollution on the front surface of the protecting glass 84 under the control of the control/time-distance conversion circuit 70.

The optical distance measurement apparatus also comprises a car collision prevention device 90 for giving an alarm to the user and accelerating or decelerating a car under the control of the control/time-distance conversion circuit 70 when a dangerous situation occurs in traveling of the car.

The light emitting circuit 20 includes the laser diode 21 as a light source for producing the high-power pulse light beam, a laser diode driving circuit 22 for driving the laser diode 21 in response to a drive signal from the control/time-distance conversion circuit 70, and a light emitting lens 23 for focusing the light beam from the laser diode 21 and diffusing the focused light beam at a desired angle to emit it to the object 10.

The light receiving circuit 30 includes a light receiving lens 31 for condensing the light beam reflected from the object 10, and an infrared-ray filter 32 for passing only a part of the light beam condensed by the light receiving lens 31, corresponding to the light beam emitted from the light emitting circuit 20, to remove an external light beam therefrom. The photo diode 33 is adapted to perform a photoelectric conversion operation for the light beam filtered by the infrared-ray filter 32 to produce an electrical signal.

Also, the light receiving circuit 30 includes an amplifier 34 for amplifying the electrical signal from the photo diode 33, and a wave-shaping circuit 35 for converting an output signal from the amplifier 34 into a digital signal and outputting the converted digital signal to the control/time-distance conversion circuit 70 so that it can recognize that the reflected light signal has been detected.

The trigger signal generation circuit 40 includes a time delay circuit 41 for delaying the drive signal from the control/time-distance conversion circuit 70 for a desired time and outputting the delayed drive signal as the trigger signal to the control/time-distance conversion circuit 70, and a time delay adjustment unit 42 for varying a time constant of the time delay circuit 41 to adjust the delay time thereof.

The pollution sensor 50 includes a photo diode 51 for receiving the part of the light beam which is emitted from the light emitting circuit 20 and then reflected from the protecting glass 84 and converting the received light beam into an electrical signal, an amplifier 52 for amplifying the electrical signal from the photo diode 51, and a light amount comparator 53 for comparing an output signal from the amplifier 52 with a reference signal and outputting the resultant signal to the control/time-distance conversion circuit 70.

Figure 2:
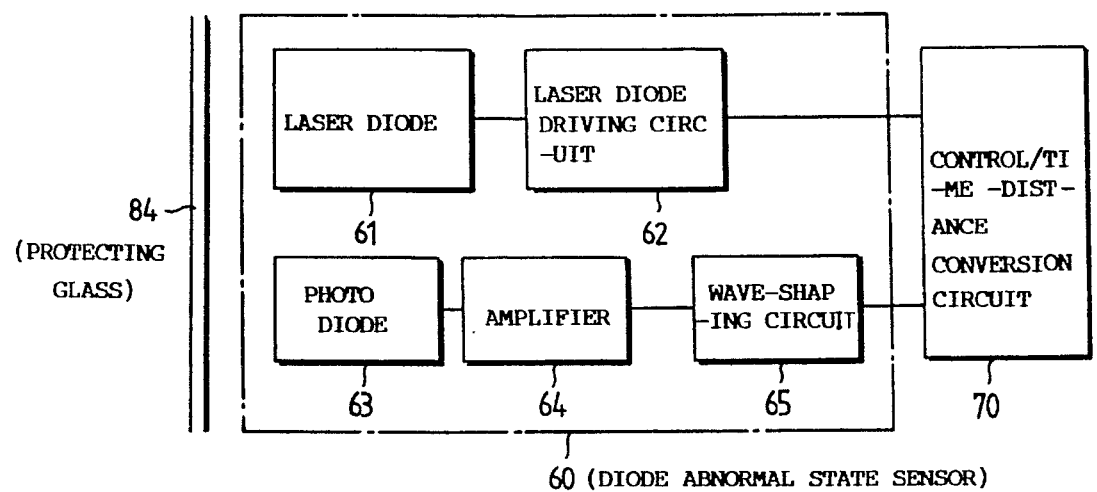
FIG. 2 is a detailed block diagram of a diode abnormal state sensor in FIG. 1.

Referring to FIG. 2, there is shown a detailed block diagram of the diode abnormal state sensor 60 in FIG. 1. As shown in this drawing, the diode abnormal state sensor 60 includes a laser diode 61 for emitting the light beam to the light receiving circuit 30 through the protecting glass 84 to monitor the light receiving photo diode 33 in the light receiving circuit 30. The light beam emitted from the laser diode 61 is an infrared ray having a wavelength corresponding to a receiving sensitivity of the light receiving photo diode 33. The diode abnormal state sensor 60 also includes a laser diode driving circuit 62 for driving the laser diode 61, a photo diode 63 for receiving the part of the light beam which is emitted from the light emitting circuit 20 and then reflected from the protecting glass 84, to monitor the light emitting laser diode 21 of the light emitting circuit 20, and converting the received light beam into an electrical signal, an amplifier 64 for amplifying the electrical signal from the photo diode 63, and a wave-shaping circuit 65 for converting an output signal from the amplifier 64 into a digital signal and outputting the converted digital signal to the control/time-distance conversion circuit 70 so that it can recognize that the reflected light signal has been detected.

Referring again to FIG. 1, the cleaning device 80 includes a cleaning motor driver 81 for outputting a motor drive signal under the control of the control/time-distance conversion circuit 70, a cleaning pad 83 for reciprocating laterally along the front surface of the protecting glass 84 to remove the pollution thereon, and a cleaning motor 82 for driving the cleaning pad 83 in response to the motor drive signal from the cleaning motor driver 81.

The operation of the optical distance measurement apparatus with the above-mentioned construction in accordance with the first embodiment of the present invention will hereinafter be described in detail.

In accordance with the first embodiment of the present invention, the protecting glass 84 is mounted on the front side of the optical distance measurement apparatus to protect the components of the apparatus from external circumstances such as dust, moisture and etc. The pollution on the front surface of the protecting glass 84 is discriminated by sensing the variation in the reflectivity of the protecting glass 84. To this end, the pollution sensor 50 is disposed adjacently to the light emitting circuit 20 to receive the part of the light beam which is emitted from the light emitting circuit 20 and then reflected from the protecting glass 84, analyze an amount of the received light beam and discriminate the pollution on the front surface of the protecting glass 84 in accordance with the analyzed result. In the pollution sensor 50, the photo diode 51 is adapted to receive the part of the light beam which is emitted from the light emitting circuit 20 and then reflected from the protecting glass 84 and the light amount comparator 53 is adapted to analyze an amount of the received light beam.

The part of the light beam which is emitted from the light emitting circuit 20 and then reflected from the protecting glass 84 is small in amount when the front surface of the protecting surface 84 is clean, whereas large in amount when the front surface of the protecting surface 84 is not clean.

In the pollution sensor 50, the photo diode 51 receives the part of the light beam which is emitted from the light emitting circuit 20 and then reflected from the protecting glass 84 and converts the received light beam into the electrical signal. The electrical signal from the photo diode 51 is amplified by the amplifier 52 and then applied to the light amount comparator 53 which is also applied with the reference signal. The light amount comparator 53 compares the amount of the received light beam with a level of the reference signal to discriminate whether the pollution is present on the front surface of the protecting surface 84. If the amount of the received light beam is greater than the level of the reference signal, the light amount comparator 53 outputs a signal indicative of the polluted state of the protecting glass 84 to the control/time-distance conversion circuit 70.

Upon receiving the output signal from the pollution sensor 50 indicating the polluted state of the protecting glass 84, the control/time-distance conversion circuit 70 controls the cleaning motor driver 81 to drive the cleaning motor 82. As the cleaning motor 82 is driven, the cleaning pad 83 cleans the protecting glass 84. In the case where the polluted state of the protecting glass 84 is continuously discriminated even after the cleaning pad 83 cleans the protecting glass 84, the control/time-distance conversion circuit 70 stops the entire operation of the apparatus and then informs the user of such a situation by means of a display unit of the car collision prevention device 90 to induce him to solve it.

In detail, in the cleaning device 80, the cleaning motor driver 81 rotates the cleaning motor 82 upon receiving a control signal from the control/time-distance conversion circuit 70. As the cleaning motor 82 is rotated, the cleaning pad 83 cleans the front surface of the protecting glass 84, reciprocating laterally along it. Thereafter, upon receiving no control signal from the control/time-distance conversion circuit 70, the cleaning pad 83 is returned to its initial position under the control of the cleaning motor driver 81 and the operation thereof is thus stopped.

Provided that the cleaning pad 83 is stopped in operation without being returned to its initial position, the control/time-distance conversion circuit 70 stops the entire operation of the apparatus and then informs the user of such a situation by means of the display unit of the car collision prevention device 90 to induce him to solve it.

Also, in accordance with the first embodiment of the present invention, the diode abnormal state sensor 60 is provided to sense the abnormal state of the light emitting laser diode 21 in the light emitting circuit 20 and the abnormal state of the light receiving photo diode 33 in the light receiving circuit 30.

To sense the abnormal state of the light emitting laser diode 21 in the light emitting circuit 20, the photo diode 63 receives the part of the light beam which is emitted from the light emitting circuit 20 and then reflected from the protecting glass 84. Namely, when the light beam is emitted from the laser diode 21 to the object 10 for the distance measurement, a part thereof is reflected from the protecting glass 84 provided at the front of the light emitting circuit 20, because a transmittivity of the protecting glass 84 is not 100%. As a result, the light beam reflected from the protecting glass 84 is received by the photo diode 63.

Then, the photo diode 63 converts the received light beam into the electrical signal. The electrical signal from the photo diode 63 is amplified by the amplifier 64 and then applied to the wave-shaping circuit 65. The wave-shaping circuit 65 converts the output signal from the amplifier 64 into the digital signal and outputs the converted digital signal to the control/time-distance conversion circuit 70.

The control/time-distance conversion circuit 70 discriminates the abnormal state of the light emitting laser diode 21 in response to the output signal from the wave-shaping circuit 65. Namely, upon receiving no output signal from the wave-shaping circuit 65 although the laser diode drive signal has been generated, the control/time-distance conversion circuit 70 determines the abnormal state of the light emitting laser diode 21 and thus informs the user of such a situation to induce him to solve it.

On the other hand, to sense the abnormal state of the light receiving photo diode 33 in the light receiving circuit 30, the laser diode driving circuit 62 drives the laser diode 61 to emit the light beam to the protecting glass 84. A part of the emitted light beam is reflected from the protecting glass 84 due to the transmittivity thereof and then received by the photo diode 33.

Then, the photo diode 33 converts the received light beam into the electrical signal. The electrical signal from the photo diode 33 is amplified by the amplifier 34 and then applied to the wave-shaping circuit 35. The wave-shaping circuit 35 converts the output signal from the amplifier 34 into the digital signal and outputs the converted digital signal to the control/time-distance conversion circuit 70.

The control/time-distance conversion circuit 70 discriminates the abnormal state of the light receiving photo diode 33 in response to the output signal from the wave-shaping circuit 35. Namely, upon receiving no output signal from the wave-shaping circuit 35 although the laser diode 61 has been driven, the control/time-distance conversion circuit 70 determines the abnormal state of the light receiving photo diode 33 and thus informs the user of such a situation to induce him to solve it.

In accordance with a second embodiment of the present invention, the error of the light emitting laser diode 21 may be sensed by using the cleaning pad 83 in the cleaning device 80 which reciprocates laterally along the front surface of the protecting glass 84 to remove the pollution thereon.

Figure 3:
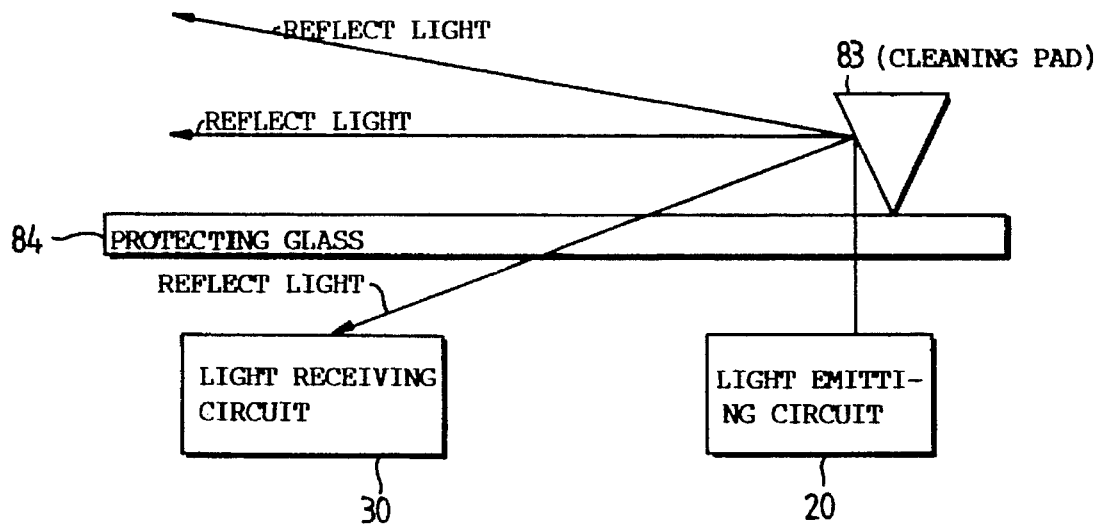
FIG. 3 is a view illustrating a construction for sensing an error of a light emitting laser diode using the cleaning device in accordance with a second embodiment of the present invention.

As shown in FIG. 3, to sense the error of the light emitting laser diode 21, the cleaning pad 83 is moved to a position slightly leaning from the center of the light emitting circuit 20 toward the light receiving circuit 30, under the control of the cleaning motor driver 81. Then, when the light emitting laser diode 21 is driven under the control of the laser diode driving circuit 22, a part of the light beam emitted therefrom impinges on a reflection surface of the cleaning pad 83 and then received by the photo diode 33 in the light receiving circuit 30. At this time, upon receiving no signal, it is discriminated that the error is present in the light emitting laser diode 21.

Figure 4:
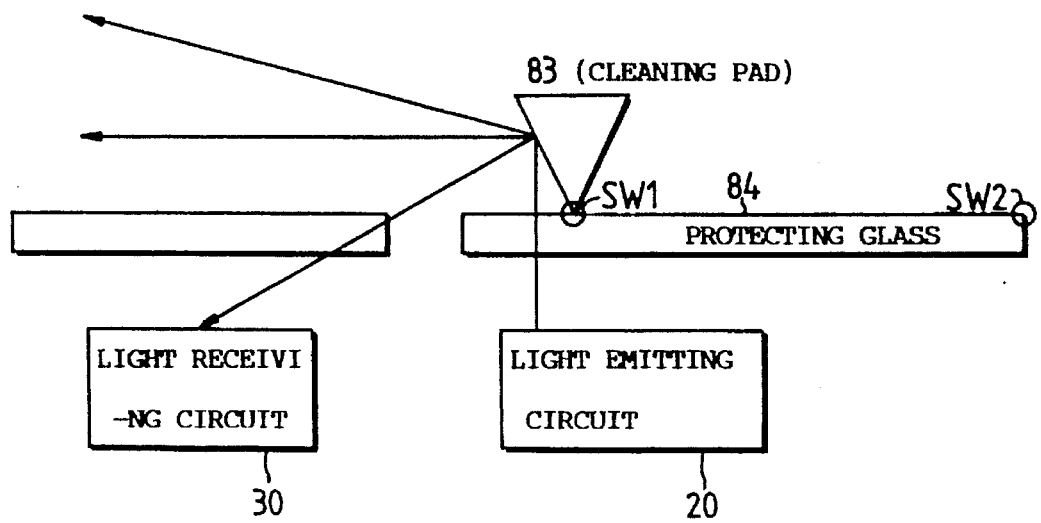
FIG. 4 is a view illustrating a construction for sensing the error of the light emitting laser diode using the cleaning device in accordance with a third embodiment of the present invention.

In accordance with a third embodiment of the present invention, as shown in FIG. 4, the error of the light emitting laser diode 21 may be sensed by using the cleaning pad 83 in the cleaning device 80 and microswitches SW1 and SW2 disposed at the initial position and the light reflecting position of the cleaning pad 83, respectively.

To sense the error of the light emitting laser diode 21, the cleaning pad 83 is moved to the position slightly leaning from the center of the light emitting circuit 20 toward the light receiving circuit 30, under the control of the cleaning motor driver 81. In this case, the protecting glass 84 is separated between the laser diode 21 and the photo diode 33 so that the light beam emitted from the laser diode 21 can not proceed to the photo diode 33 along its surface. The microswitches SW1 and SW2 are disposed at the initial position and the light reflecting position of the cleaning pad 83, respectively. The laser diode 21 emits the light beam when the cleaning pad 83 reaches the microswitch SW2 under the control of the cleaning motor driver 81. Namely, the laser diode 21 emits the light beam when the microswitch SW2 is turned on as being grounded. The light beam emitted from the laser diode 21 is diffusely reflected from the nonuniform reflection surface of the cleaning pad 83 and a part thereof is received by the photo diode 33. At this time, if the microswitch SW2 is not at its ON state, the above operation is again performed beginning with the initial position of the cleaning pad 83. If the microswitch SW2 is still not at its ON state, it is discriminated that an error is present in the cleaning motor driver 81 and an error alarm unit (not shown) is then driven to give an alarm.

At this time, distance data measured by the control/time-distance conversion circuit 70 in the case where the error is not present in the light emitting laser diode 21 includes a delay error resulting from a temperature variation, faulty operations of the components and etc. For this reason, an actual distance to the object 10 can be measured by subtracting such an offset distance value from a measured distance value to the object 10. Namely,

ACTUAL DISTANCE=MEASURED DISTANCE−OFFSET DISTANCE

There is no necessity for measuring frequently the offset distance value. As a result, it must be discriminated whether the offset measurement is required.

Figure 5:
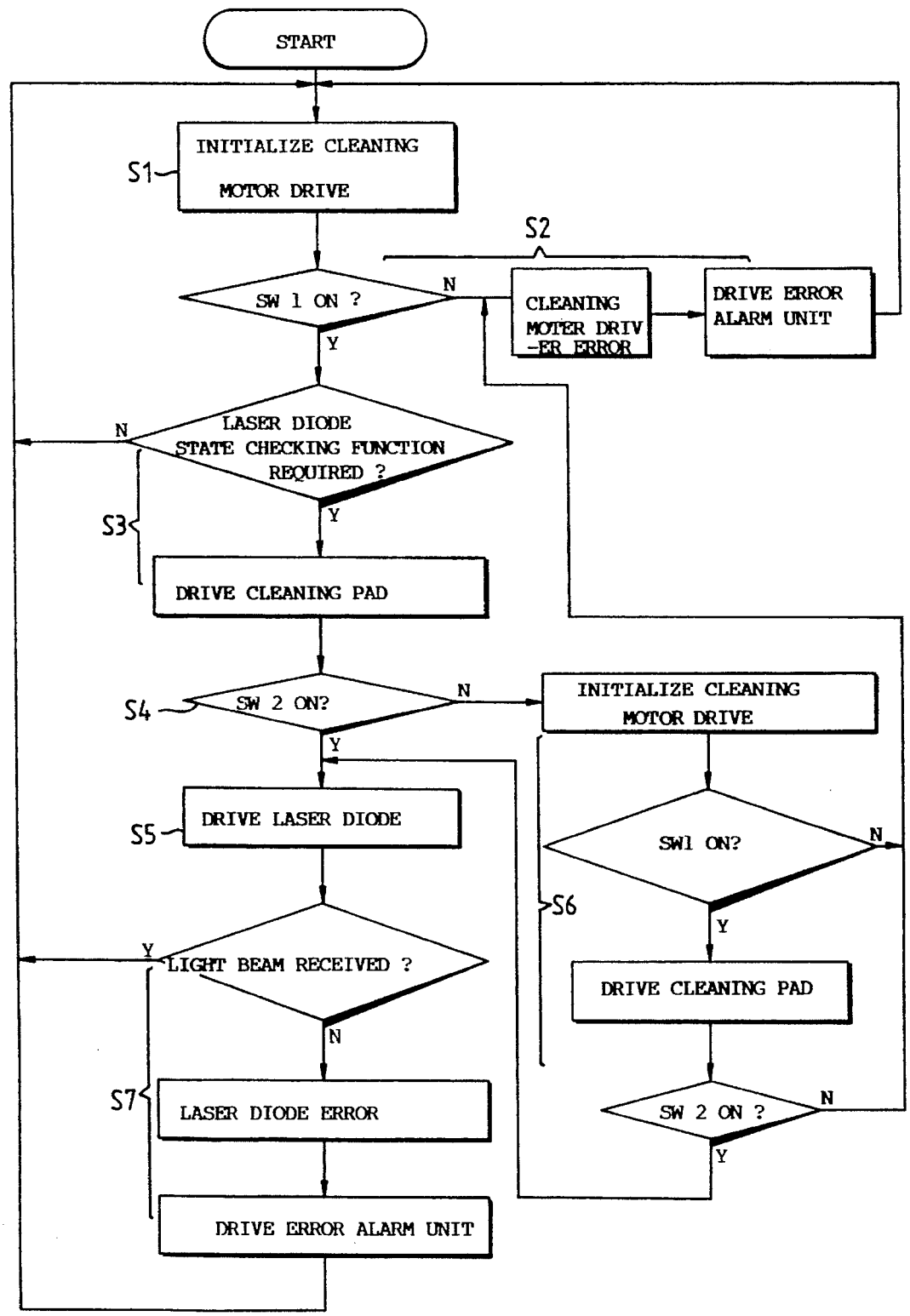
FIG. 5 is a flowchart illustrating the operation of sensing the error of the light emitting laser diode using the cleaning device in accordance with the third embodiment of the present invention.

FIG. 5 is a flowchart illustrating the operation of sensing the error of the light emitting laser diode 21 using the cleaning device 80 in accordance with the third embodiment of the present invention. The cleaning motor driver 81 is initialized at the first step S1. At the second step S2, it is discriminated whether the microswitch SW1 is at its ON state. If it is discriminated that the microswitch SW1 is not at its ON state, it is discriminated that an error is present in the cleaning motor driver 81 and the error alarm unit is then driven to give the alarm. On the contrary, if it is discriminated at the second step S2 that the microswitch SW1 is at its ON state, it is discriminated at the third step S3 whether a laser diode state checking function is required. If it is discriminated that the laser diode state checking function is not required, the operation is returned to the first step S1. On the contrary, if it is discriminated that the laser diode state checking function is required, the cleaning pad 83 is moved to the microswitch SW2. When the cleaning pad 83 reaches the microswitch SW2, it is discriminated at the fourth step S4 whether the microswitch SW2 is at its ON state. If it is discriminated at the fourth step S4 that the microswitch SW2 is at its ON state, the laser diode 21 is driven to emit the light beam, at the fifth step S5. On the contrary, if it is discriminated at the fourth step S4 that the microswitch SW2 is not at its ON state, the cleaning motor driver 81 is again initialized to move the cleaning pad 83 to its initial position, at the sixth step S6. Then at the sixth step S6, it is discriminated whether the microswitch SW1 is at its ON state. If it is discriminated that the microswitch SW1 is at its ON state, the cleaning pad 83 is driven to perform the laser diode state checking function. Then at the sixth step S6, it is discriminated whether the microswitch SW2 is at its ON state. If it is discriminated that the microswitch SW2 is not at its ON state, it is discriminated that the error is present in the cleaning motor driver 81 and the error alarm unit is then driven to give the alarm. On the contrary, if it is discriminated that the microswitch SW2 is at its ON state, the operation proceeds to the fifth step S5 of driving the laser diode 21 to emit the light beam. After performing the fifth step S5, it is checked at the seventh step S7 whether the photo diode 33 receives the part of the light beam which is emitted from the laser diode 21 and then reflected from the reflection surface of the cleaning pad 83. If it is checked that the photo diode 33 receives the reflected light beam, it is determined that the error is not present in the laser diode 21 and the operation is then returned to the first step S1. On the contrary, if it is checked that the photo diode 33 receives no light beam, it is determined that the error is present in the laser diode 21 and the error alarm unit is then driven to give the alarm.

Figure 6:
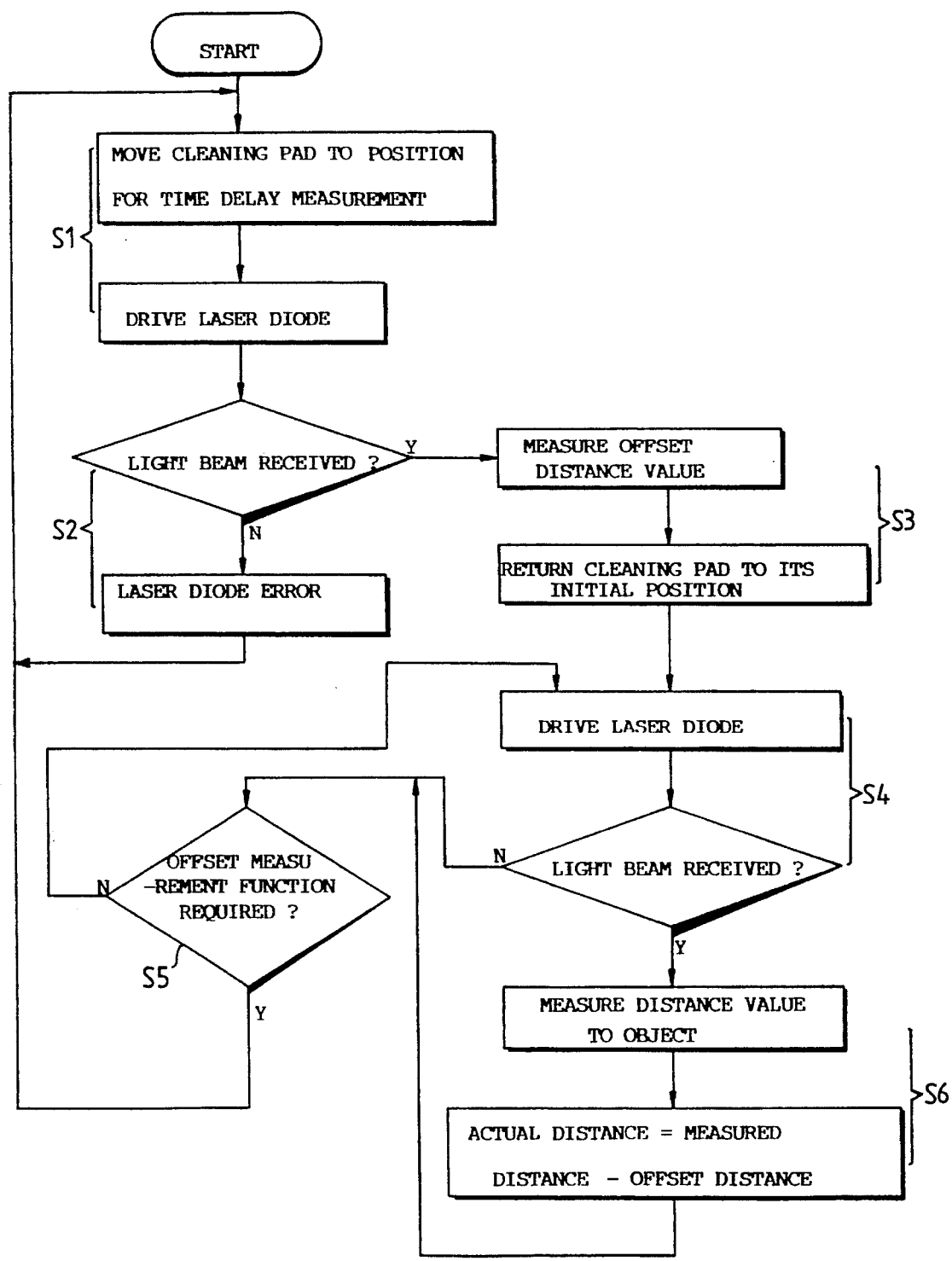
FIG. 6 is a flowchart illustrating the operation of removing an offset distance value using a laser diode state checking function in accordance with the third embodiment of the present invention.

FIG. 6 is a flowchart illustrating the operation of removing the offset distance value using the laser diode state checking function in accordance with the third embodiment of the present invention. At the first step S1, the cleaning pad 83 is moved to the position for the time delay measurement and the laser diode 21 is driven to emit the light beam. It is checked at the second step S2 whether the photo diode 33 receives the part of the light beam which is emitted from the laser diode 21 and then reflected from the reflection surface of the cleaning pad 83. If it is checked that the photo diode 33 receives no light beam, it is determined that the error is present in the laser diode 21 and the operation is returned to the first step S1. On the contrary, if it is checked at the second step S2 that the photo diode 33 receives the reflected light beam, the offset distance value is measured and the cleaning pad 83 is returned to its initial position at the third step S3. At the fourth step S4, the laser diode 21 is driven to emit the light beam. Then at the fourth step S4, it is checked whether the photo diode 33 receives the light beam reflected from the object 10. If it is checked at the fourth step S4 that the photo diode 33 receives no light beam, it is discriminated at the fifth step S5 whether an offset measurement function is required. If it is discriminated at the fifth step S5 that the offset measurement function is required, the operation is returned to the first step S1. On the contrary, if it is discriminated at the fifth step S5 that the offset measurement function is not required, the operation is returned to the fourth step S4. If it is checked at the fourth step S4 that the photo diode 33 receives the light beam reflected from the object 10, the distance value to the object 10 is measured at the sixth step S6. Then at the sixth step S6, the actual distance to the object 10 is obtained by subtracting the offset distance value measured at the third step S3 from the measured distance value to the object 10. Then, the operation is returned to the fifth step S5.

Figure 7:
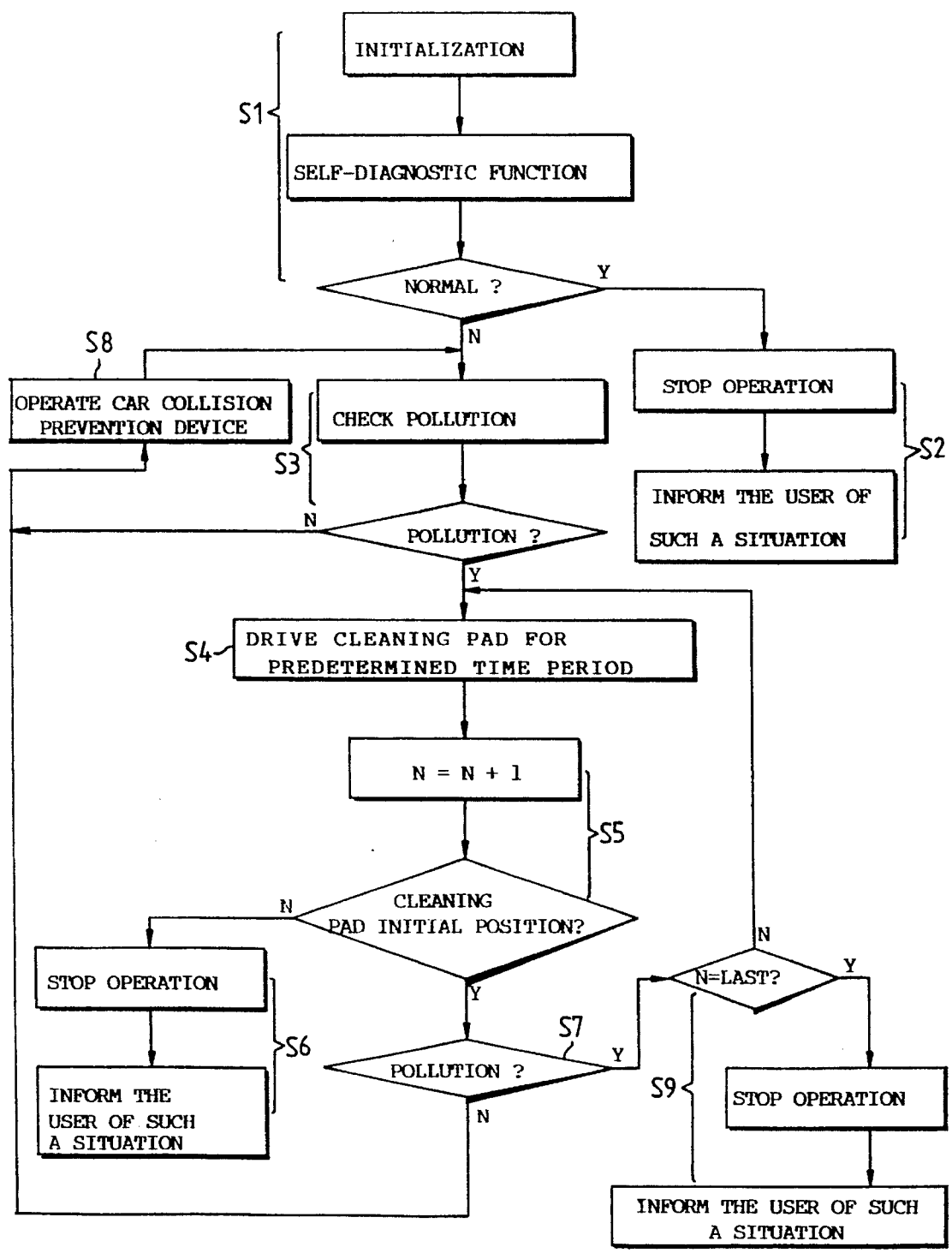
FIG. 7 is a flowchart illustrating the operation of a pollution sensor in accordance with the first embodiment of the present invention.

FIG. 7 is a flowchart illustrating the operation of the pollution sensor 50 in accordance with the first embodiment of the present invention. At the first step S1, the system is initialized and a self-diagnostic function is performed to check whether the system is normal. If it is checked at the first step S1 that the system is not normal, the operation is stopped and such a situation is informed the user at the second step S2. If it is checked at the first step S1 that the system is normal, it is checked at the third step S3 whether the pollution is present on the front surface of the protecting glass 84. If it is checked at the third step S3 that the pollution is present on the front surface of the protecting glass 84, the cleaning pad 83 is driven for a predetermined time period to clean the pollution on the front surface of the protecting glass 84, at the fourth step S4. It is checked at the fifth step S5 whether the cleaning pad 83 is at its initial position after being driven for the predetermined time period at the fourth step S4. If it is checked at the fifth step S5 that the cleaning pad 83 is not at its initial position, the operation is stopped and such a situation is informed the user at the sixth step S6. This sixth step S6 is performed for preventing an obstruction in the transmission and reception of the light beam due to the cleaning pad 83 from having a bad effect on the system. On the contrary, if it is checked at the fifth step S5 that the cleaning pad 83 is at its initial position, it is checked at the seventh step S7 whether the pollution is present on the front surface of the protecting glass 84. If it is checked at the seventh step S7 that the pollution is not present on the front surface of the protecting glass 84, the car collision prevention device 90 is operated at the eighth step S8. On the contrary, if it is checked at the seventh step S7 that the pollution is present on the front surface of the protecting glass 84, the operation is returned to the fourth step S4 to drive repeatedly the cleaning pad 83 by up to a predetermined maximum number of times. In the case where the pollution is present on the front surface of the protecting glass 84 even after the cleaning pad 83 is repeatedly driven by up to the predetermined maximum number of times, the operation is stopped and such a situation is informed the user at the ninth step S9.

Figure 8:
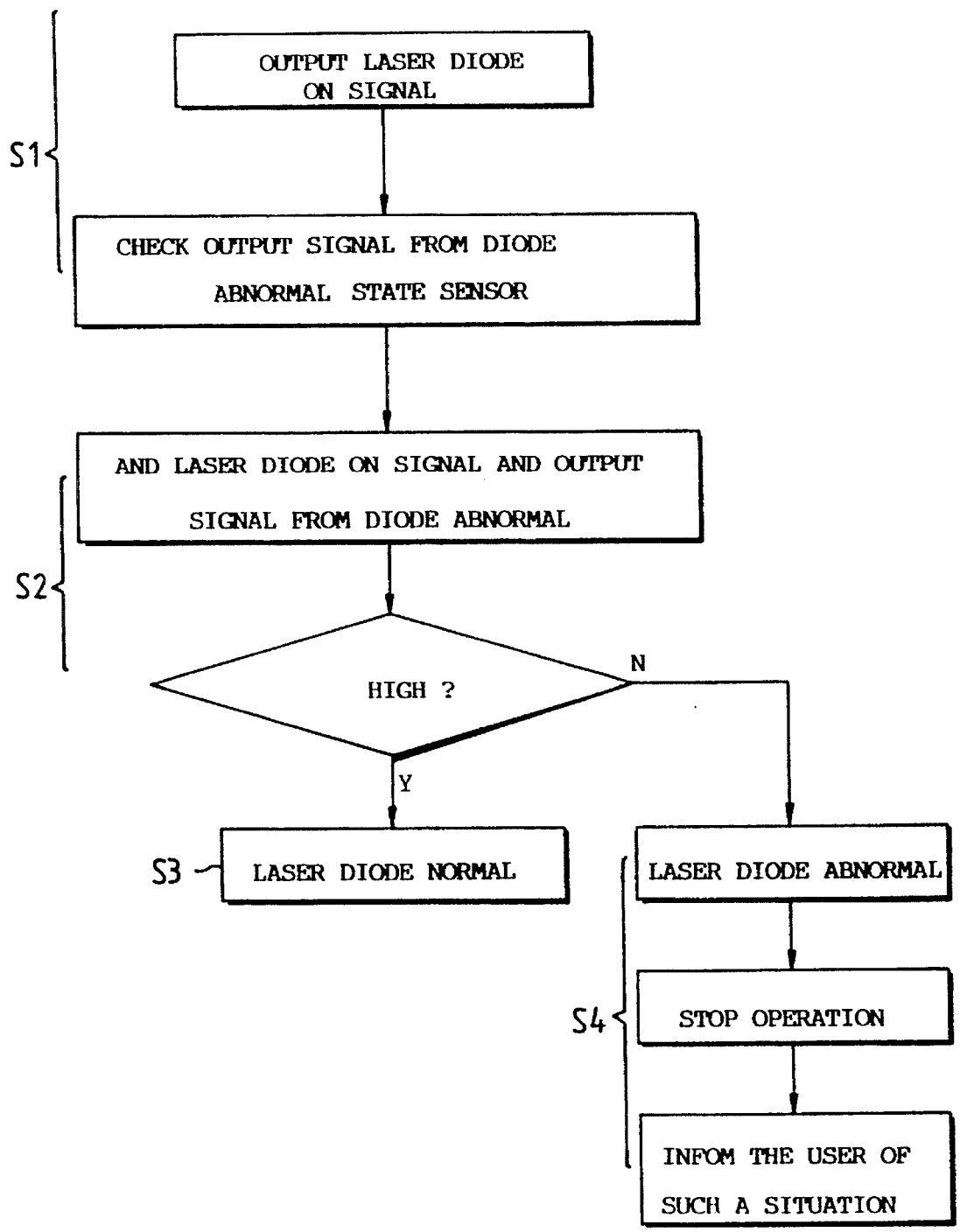
FIG. 8 is a flowchart illustrating the operation of sensing the error of the light emitting laser diode using the diode abnormal state sensor in accordance with the first embodiment of the present invention.

FIG. 8 is a flowchart illustrating the operation of sensing the error of the light emitting laser diode 21 using the diode abnormal state sensor 60 in accordance with the first embodiment of the present invention. At the first step S1, a laser diode ON signal is outputted and the output signal from the diode abnormal state sensor 60 is checked. At the second step S2, the laser diode ON signal is ANDed with the output signal from the diode abnormal state sensor 60 and it is checked whether the ANDed signal is high in level. If it is checked at the second step S2 that the ANDed signal is high in level, it is determined that the laser diode 21 is normal and the operation is thus normally performed at the third step S3. On the contrary, if it is checked at the second step S2 that the ANDed signal is low in level, it is determined that the laser diode 21 is abnormal, the operation is stopped and such a situation is informed the user at the fourth step S4.

Figure 9:
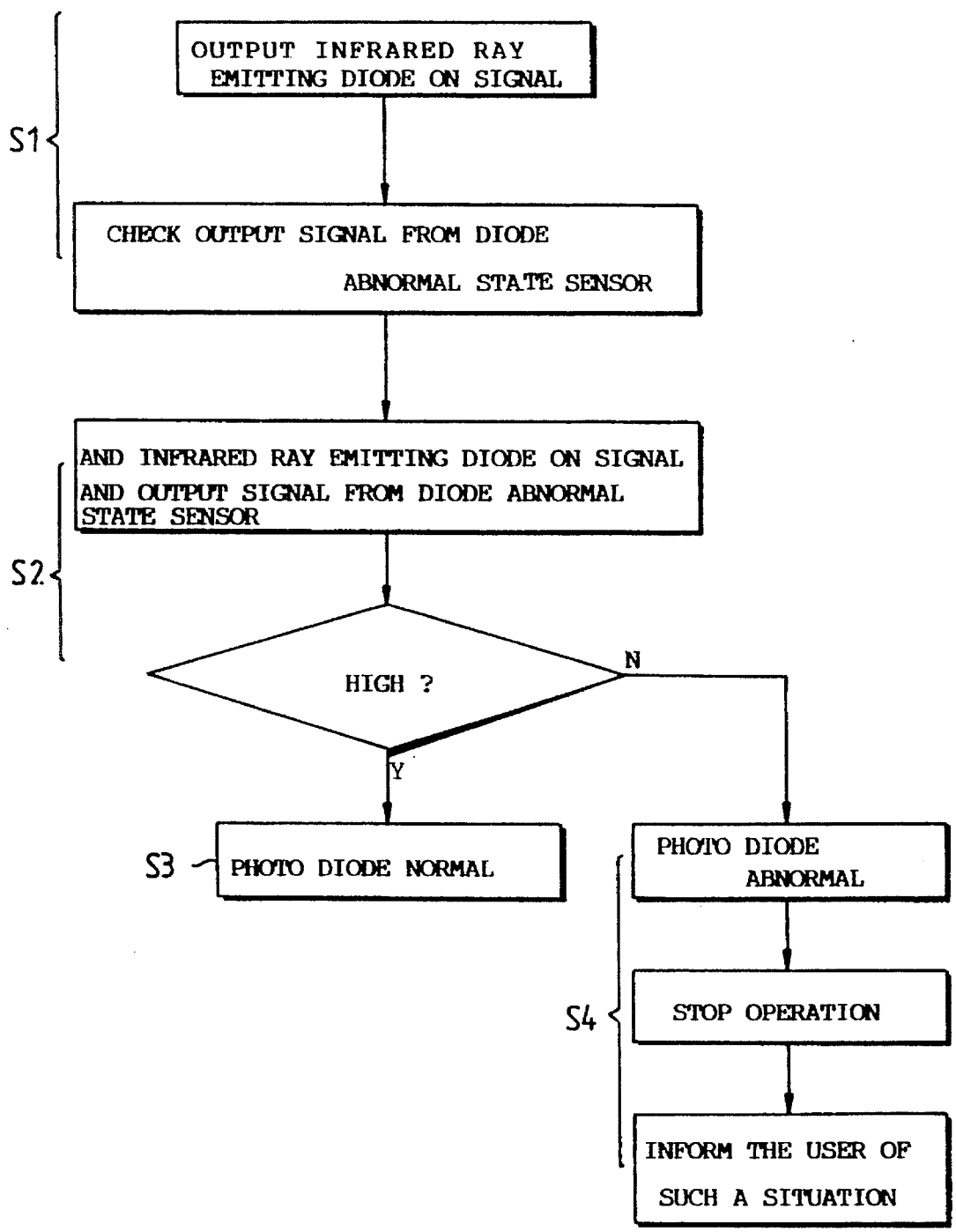
FIG. 9 is a flowchart illustrating the operation of sensing an error of a light receiving photo diode using the diode abnormal state sensor in accordance with the first embodiment of the present invention.

FIG. 9 is a flowchart illustrating the operation of sensing the error of the light receiving photo diode 33 using the diode abnormal state sensor 60 in accordance with the first embodiment of the present invention. At the first step S1, an infrared ray emitting diode ON signal is outputted and the output signal from the diode abnormal state sensor 60 is checked. At the second step S2, the infrared ray emitting diode ON signal is ANDed with the output signal from the diode abnormal state sensor 60 and it is checked whether the ANDed signal is high in level. If it is checked at the second step S2 that the ANDed signal is high in level, it is determined that the photo diode 33 is normal and the operation is thus normally performed at the third step S3. On the contrary, if it is checked at the second step S2 that the ANDed signal is low in level, it is determined that the photo diode 33 is abnormal, the operation is stopped and such a situation is informed the user at the fourth step S4.

As apparent from the above description, according to the present invention, the pollution on the front surface of the glass for protecting the components in the apparatus can be sensed and the error of the laser diode can be checked using the protecting glass. Also, the cleaning device is provided to remove the pollution on the front surface of the protecting glass. Further, the errors of the laser diode and the photo diode can be checked using the cleaning device. These have the effect of enhancing the reliability of the optical distance measurement apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical distance measurement apparatus comprising:

light emitting means for emitting a high-power pulse light beam as a distance measuring medium to an object;

light receiving means for receiving a light beam reflected from the object;

trigger signal generation means, coupled to said light emitting means, for generating a trigger signal indicative of a start time point for measurement of a light moving time;

pollution sensing means for receiving a part of the light beam which is emitted from said light emitting means and then reflected from a protecting glass mounted on a front side of the apparatus, to sense a variation in a reflectivity of said protecting glass, and discriminating pollution on a front surface of said protecting glass in accordance with the sensed result;

diode abnormal state sensing means for receiving the part of the light beam which is emitted from said light emitting means and then reflected from said protecting glass, to sense an abnormal state of a light emitting laser diode in said light emitting means, and emitting a light beam to said light receiving means through said protecting glass to sense whether a light receiving photo diode in said light receiving means is in a normal or abnormal state and to output an output signal indicating whether or not the reflected light signal has been detected;

control/time-distance conversion means, coupled to said light emitting means, said light receiving means, said trigger generation means, said pollution sensing means, and said diode abnormal state sensing means, for controlling the entire operation of the apparatus in response to an output signal from said pollution sensing means and said output signal from said diode abnormal state sensing means, measuring the light moving time in response to the trigger signal from said trigger signal generation means and an output signal from said light receiving means and converting the measured light moving time into a distance to the object;

cleaning means for removing the pollution on the front surface of said protecting glass under the control of said control/time-distance conversion means; and car collision prevention means for giving an alarm to the user and accelerating or decelerating a car under the control of said control/time-distance conversion means when a dangerous situation occurs in traveling of the car.

2. An optical distance measurement apparatus as set forth in claim 1, wherein said light emitting means includes:

said laser diode being a light source for producing the high-power pulse light beam;

a laser diode driving circuit for driving said laser diode in response to a drive signal from said control/time-distance conversion means; and a light emitting lens for focusing the light beam from said laser diode and diffusing the focused light beam at a desired angle to emit it to the object.

3. An optical distance measurement apparatus as set forth in claim 1, wherein said light receiving means includes:

a light receiving lens for condensing the light beam reflected from the object;

an infrared-ray filter for passing only a part of the light beam condensed by said light receiving lens, corresponding to the light beam emitted from said light emitting means, to remove an external light beam therefrom;

said photo diode performing a photoelectric conversion operation for the light beam filtered by said infrared-ray filter to produce an electrical signal;

an amplifier for amplifying the electrical signal from said photo diode; and a wave-shaping circuit for converting an output signal from said amplifier into a digital signal and outputting the converted digital signal to said control/time-distance conversion means so that it can recognize that the reflected light signal has been detected.

4. An optical distance measurement apparatus as set forth in claim 1, wherein said trigger signal generation means includes:

a time delay circuit for delaying the drive signal from said control/time-distance conversion means for a desired time and outputting the delayed drive signal as the trigger signal to said control/time-distance conversion means; and a time delay adjustment unit for varying a time constant of said time delay circuit to adjust the delay time thereof.

5. An optical distance measurement apparatus as set forth in claim 1, wherein said pollution sensing means includes:

a photo diode for receiving the part of the light beam which is emitted from said light emitting means and then reflected from said protecting glass and converting the received light beam into an electrical signal;

an amplifier for amplifying the electrical signal from said photo diode; and a light amount comparator for comparing an output signal from said amplifier with a reference signal and outputting the resultant signal to said control/time-distance conversion means.

6. An optical distance measurement apparatus as set forth in claim 1, wherein said diode abnormal state sensing means includes:

a laser diode for emitting the light beam to said light receiving means through said protecting glass to monitor said light receiving photo diode in said light receiving means, said light beam emitted from said laser diode being an infrared ray having a wavelength corresponding to a receiving sensitivity of said light receiving photo diode;

a laser diode driving circuit for driving said laser diode;

a photo diode for receiving the part of the light beam which is emitted from said light emitting means and then reflected from said protecting glass, to monitor said light emitting laser diode in said light emitting means, and converting the received light beam into an electrical signal;

an amplifier for amplifying the electrical signal from said photo diode; and a wave-shaping circuit for converting an output signal from said amplifier into a digital signal and outputting the converted digital signal to said control/time-distance conversion means so that it can recognize that the reflected light signal has been detected.

7. An optical distance measurement apparatus as set forth in claim 1, wherein said cleaning means includes:

a cleaning motor driver for outputting a motor drive signal under the control of said control/time-distance conversion means;

a cleaning pad for reciprocating laterally along the front surface of said protecting glass to remove the pollution thereon; and a cleaning motor for driving said cleaning pad in response to the motor drive signal from said cleaning motor driver.

8. An optical distance measurement method comprising the steps of:

(a) driving a laser diode to emit a light beam to an object, receiving a part of the light beam which is emitted from said laser diode and then reflected from a protecting glass and sensing pollution on a front surface of said protecting glass in accordance with the received state;

(b) sensing an error of said laser diode;

(c) sensing an error of a photo diode for receiving the light beam from said laser diode; and (d) measuring a time delay value resulting from a temperature variation and obtaining an actual distance to the object on the basis of the measured time delay value, wherein said step (b) of sensing the error of said laser diode includes the steps of:

(b-1) initializing a cleaning motor driver;

(b-2) discriminating whether a first microswitch is at its ON state, determining that an error is present in said cleaning motor driver, if it is discriminated that said first microswitch is not at its ON state, and then driving an error alarm unit to give an alarm;

(b-3) discriminating whether a laser diode state checking function is required, if it is discriminated at said step (b-2) that said first microswitch is at its ON state, returning the operation to said step (b-1) if it is discriminated that the laser diode state checking function is not required and moving a cleaning pad to a second microswitch if it is discriminated that the laser diode state checking function is required;

(b-4) discriminating whether said second microswitch is at its ON state when said cleaning pad reaches said second microswitch;

(b-5) driving said laser diode to emit the light beam, if it is discriminated at said step (b-4) that said second microswitch is at its ON state;

(b-6) initializing said cleaning motor driver again to move said cleaning pad to its initial position, if it is discriminated at said step (b-4) that said second microswitch is not at its ON state, discriminating whether said first microswitch is at its ON state, driving said cleaning pad to perform the laser diode state checking function, if it is discriminated that said first microswitch is at its ON state, and discriminating whether said second microswitch is at its ON state;

(b-7) determining that the error is present in said cleaning motor driver, if it is discriminated at said step (b-6) that said second microswitch is not at its ON state, driving said error alarm unit to give the alarm and performing said step (b-5) of driving said laser diode to emit the light beam, if it is discriminated at said step (b-6) that said second microswitch is at its ON state; and (b-8) checking, after performing said step (b-5), whether said photo diode receives a part of the light beam which is emitted from said laser diode and then reflected from a reflection surface of said cleaning pad, determining that the error is present in said laser diode, if it is checked that said photo diode receives the reflected light beam, returning the operation to said step (b-1), determining that the error is present in said laser diode, if it is checked that said photo diode receives no light beam, and then driving said error alarm unit to give the alarm.

9. An optical distance measurement method as set forth in claim 8, wherein said step (d) of measuring the time delay value resulting from the temperature variation includes the steps of:

(d-1) moving a cleaning pad to a position for the time delay measurement and driving said laser diode to emit the light beam;

(d-2) checking whether said photo diode receives a part of the light beam which is emitted from, said laser diode and then reflected from a reflection surface of said cleaning pad, determining that the error is present in said laser diode, if it is checked that said photo diode receives no light beam, and then returning the operation to said step (d-1);

(d-3) measuring an offset distance value if it is checked at said step (d-2) that said photo diode receives the reflected light beam and returning said cleaning pad to its initial position;

(d-4) driving said laser diode to emit the light beam and checking whether said photo diode receives the light beam reflected from the object;

(d-5) discriminating whether an offset measurement function is required, if it is checked at said step (d-4) that said photo diode receives no light beam, returning the operation to said step (d-1) if it is discriminated that the offset measurement function is required and returning the operation to said step (d-4) if it is discriminated that the offset measurement function is not required; and (d-6) measuring a distance value to the object if it is checked at said step (d-4) that said photo diode receives the light beam reflected from the object, obtaining the actual distance to the object by subtracting the offset distance value measured at said step (d-3) from the measured distance value to the object and then returning the operation to said step (d-5).

10. An optical distance measurement method as set forth in claim 8, wherein said step (a) of sensing the pollution on the front surface of said protecting glass includes the steps of:

(a-1) initializing a system and performing a self-diagnostic function to check whether the system is normal;

(a-2) stopping the operation if it is checked at said step (a-1) that the system is not normal and informing the user of such a situation;

(a-3) checking whether the pollution is present on the front surface of said protecting glass, if it is checked at said step (a-1) that the system is normal;

(a-4) driving a cleaning pad for a predetermined time period to clean the pollution on the front surface of said protecting glass, if it is checked at said step (a-3) that the pollution is present on the front surface of said protecting glass;

(a-5) checking whether said cleaning pad is at its initial position after being driven for the predetermined time period at said step (a-4);

(a-6) stopping the operation if it is checked at said step (a-5) that said cleaning pad is not at its initial position and informing the user of such a situation to prevent an obstruction in the transmission and reception of the light beam due to said cleaning pad from having a bad effect on the system;

(a-7) checking whether the pollution is present on the front surface of said protecting glass, if it is checked at said step (a-5) that said cleaning pad is at its initial position;

(a-8) operating a car collision prevention device if it is checked at said step (a-7) that the pollution is not present on the front surface of said protecting glass; and (a-9) returning the operation to said step (a-4) to drive repeatedly said cleaning pad by up to a predetermined maximum number of times, if it is checked at said step (a-7) that the pollution is present on the front surface of said protecting glass, stopping the operation if the pollution is present on the front surface of said protecting glass even after said cleaning pad is repeatedly driven by up to the predetermined maximum number of times, and then informing the user of such a situation.

11. An optical distance measurement method as set forth in claim 8, wherein said step (c) of sensing the error of said photo diode includes the steps of:

(c-1) outputting an infrared ray emitting diode ON signal and checking an output signal from a diode abnormal state sensor;

(c-2) ANDing the infrared ray emitting diode ON signal and the output signal from said diode abnormal state sensor and checking whether the ANDed signal is high in level;

(c-3) determining that said photo diode is normal, if it is checked at said step (c-2) that the ANDed signal is high in level, and performing the operation normally; and (c-4) determining that said photo diode is abnormal, if it is checked at said step (c-2) that the ANDed signal is low in level, stopping the operation and informing the user of such a situation.

12. An optical distance measurement method comprising the steps of:

(a) driving a laser diode to emit a light beam to an object receiving a part of the light beam which is emitted from said laser diode and then reflected from a protecting glass and sensing pollution on a front surface of said protecting glass in accordance with the received state;

(b) sensing an error of said laser diode;

(c) sensing an error of a photo diode for receiving the light beam from said laser diode; and (d) measuring a time delay value resulting from a temperature variation and obtaining an actual distance to the object on the basis of the measured time delay value, wherein said step (b) of sensing the error of said laser diode includes the steps of:

(b-1) outputting a laser diode ON signal and checking an output signal from a diode abnormal state sensor;

(b-2) ANDing the laser diode ON signal and the output signal from said diode abnormal state sensor and checking whether the ANDed signal is high in level;

(b-3) determining that said laser diode is normal, if it is checked at said step (b-2) that the ANDed signal is high in level, and performing the operation normally; and (b-4) determining that said laser diode is abnormal, if it is checked at said step (b-2) that the ANDed signal is low in level, stopping the operation and informing the user of such a situation.

* * * * *